United States Patent [19]

Kano

[11] Patent Number: 4,808,802
[45] Date of Patent: Feb. 28, 1989

[54] METHOD AND SYSTEM FOR PROTECTING INFORMATION RECORDED IN INFORMATION MEDIUM

[75] Inventor: Mitsunari Kano, Seto, Japan

[73] Assignee: Hitachi, Ltd., Tokyo, Japan

[21] Appl. No.: 79,048

[22] Filed: Jul. 29, 1987

[30] Foreign Application Priority Data

Aug. 25, 1986 [JP] Japan ................... 61-198725

[51] Int. Cl.⁴ .............................................. G06K 5/00
[52] U.S. Cl. .................................................. 235/380
[58] Field of Search .............................. 235/380, 375

[56] References Cited

U.S. PATENT DOCUMENTS 4,394,654 7/1983 Hofmann-Cerfontaine ........ 235/380

Primary Examiner—Roy N. Envall, Jr.
Attorney, Agent, or Firm—Antonelli, Terry & Wands

[57] ABSTRACT

A time limiting function is incorporated in an information carrying medium such as IC card to check whether the current time traced constantly reaches a preset limit time. When the current time reaches the limit time, information to be protected and stored in a memory is erased. For convenience of the user possessing the information carry medium, a card holder is provided which can be connected to the information carrying medium to stop the time limiting function.

10 Claims, 3 Drawing Sheets

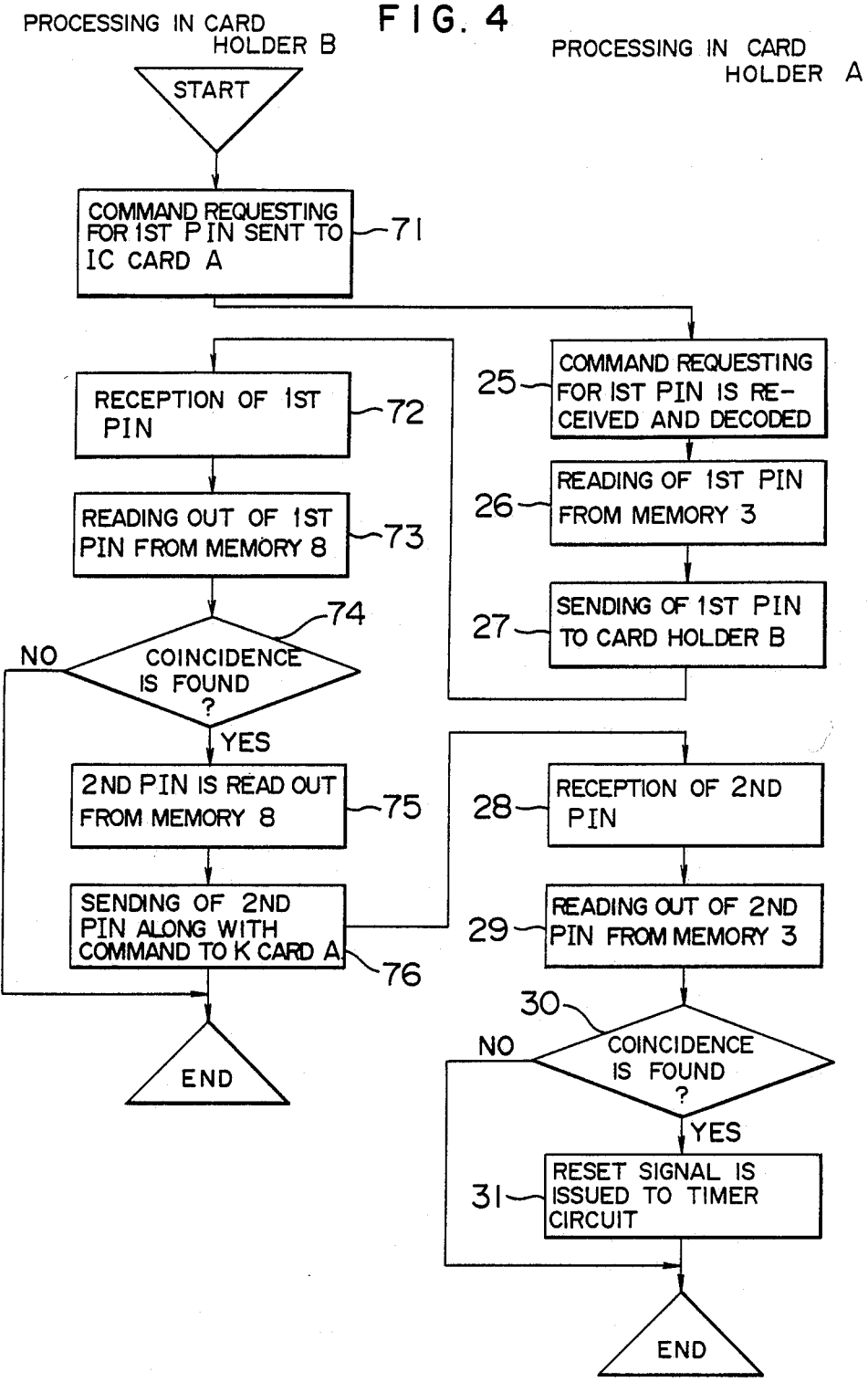

METHOD AND SYSTEM FOR PROTECTING INFORMATION RECORDED IN INFORMATION MEDIUM

BACKGROUND OF THE INVENTION

The present invention relates to an information carrying medium such as IC card and the like used in cash dispensing bank terminals, POS (Point of Sales) and other equipment. More particularly, the invention is concerned with an information protecting method which is effective for protecting secret information as the well as information medium against defraudation.

The security of secrecy in the information carrying medium such as an IC card or the like is ensured mainly by resorting to the use of personal identification number (hereinafter referred to as PIN) in the present state of the art. Of course, it is also known to encode the contents recoded in the medium in an effort to make difficult the read-out of the contents. However, in consideration of the fact that defrauders' technique for attempting to make access to the secret information has been considerably enhanced recently, much difficulty is encountered in taking the more positive and secure measures for protecting the information against defraudation.

By way of example, Japanese Patent Laid-Open Publication No. 60-198683 discloses an IC card system in which a random access memory (RAM) is incorporated in the IC card for storing a time limit within which the information entered in the IC card can be read out and the transaction using the IC card is validated.

In the case of the prior known IC card system mentioned above, the data can be read out from the IC card by means of a card reader/writer device. As a result, there exists still a possibility that the contents of the card might be read out through suitable means for the bad-will purpose such as illegal alteration of the valid term, presenting a problem remaining not yet solved.

SUMMARY OF THE INVENTION

It is an object of the present invention to provide a method and apparatus for erasing an information carrying medium upon expiration of a limit term or time by incorporating a time limiting function internally in the information carrying medium.

In view of the above object, there is provided according to an aspect of the present invention an information carrying medium which comprises storage means for storing information to be protected, timer means for keeping elapsed time from the activation thereof in terms of the current time being updated, and control means for examining whether the current time reaches a preset limit time, to thereby erase the information to be protected when the current time reaches the limit time.

Another object of the present invention is to provide means for stopping the above mentioned time limiting function of the information carrying medium for the convenience of the authorized user of the information medium.

In view of the above object, there is provided according to another aspect of the present invention a card holder carried by the user and adapted to be connected to the information carrying medium incorporating the time limiting function so that PIN is sent to the information carrying medium from the card holder. When the PIN is received before the predetermined limit time has been expired, the former is compared with a PIN stored internally in the information medium. When coincidence results from the comparison, either one of the current time or the limit time is altered so that time difference therebetween is increased. In this manner, the time limit within which the information medium is allowed t remain valid can be extended.

BRIEF DESCRIPTION OF THE DRAWINGS

FIG. 4 is a view showing a flow chart for illustrating flow of processing performed internally in the IC card and the card holder connected to the latter.

DESCRIPTION OF THE PREFERRED EMBODIMENTS

In the following, the present invention will be described in detail in conjunction with exemplary embodiments thereof with reference to the accompanying drawings.

Figure 1:
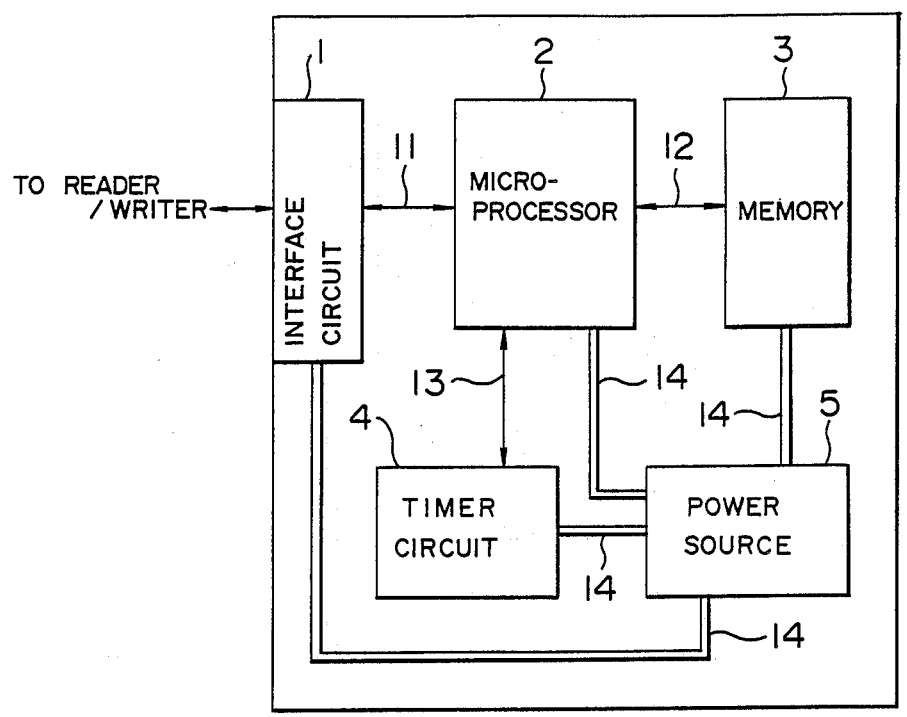
FIG. 1 is a block diagram showing a general arrangement of an IC card according to an embodiment of the present invention.

FIG. 1 is a view showing in a block diagram an IC card, a typical one of the information mediums or carriers. In the figure, a reference numeral 2 denotes a microprocessor or alternative control means (hereinafter referred to as the processor) which is responsible for the control of the IC card as a whole. A numeral 3 denotes a memory or storage means which is connected to the processor 2 by way of a signal line 12 and serves for storing a program executed by the processor 2 as well as data read out or written in by the processor 2 and additionally the information to be protected. A numeral 1 denotes an interface circuit which is connected to a reader/writer of higher rank through contact terminals of the IC card and serves to convert signals supplied from the reader/writer device so as to be transferred to the processor. The interface circuit 1 also serves for conversion of the signals supplied from the processor 2 for transfer to the reader/writer. A reference numeral 4 denotes a timer circuit or timer means composed of a clock mechanism and a register for storing in terms of digital value the time indicated by the clock mechanism, the timer circuit 4 being connected to the processor 2 by way of a signal line 13. The content of the register incorporated in the timer circuit 4 can be reset by sending a RESET signal to the timer circuit 4 from the processor 2. On the other hand, when a READ command is provided to the timer circuit 4, the content of the register thereof can be read out to be subsequently transferred to a register incorporated in the processor 2. Finally, a reference numeral 5 denotes a power supply connected to the interface circuit 1, processor 2, the memory 3 and the timer circuit 4 by way of a power supply line 14 for supplying electric power to these components. Normally, the power supply is constituted by a cell.

Figure 2:
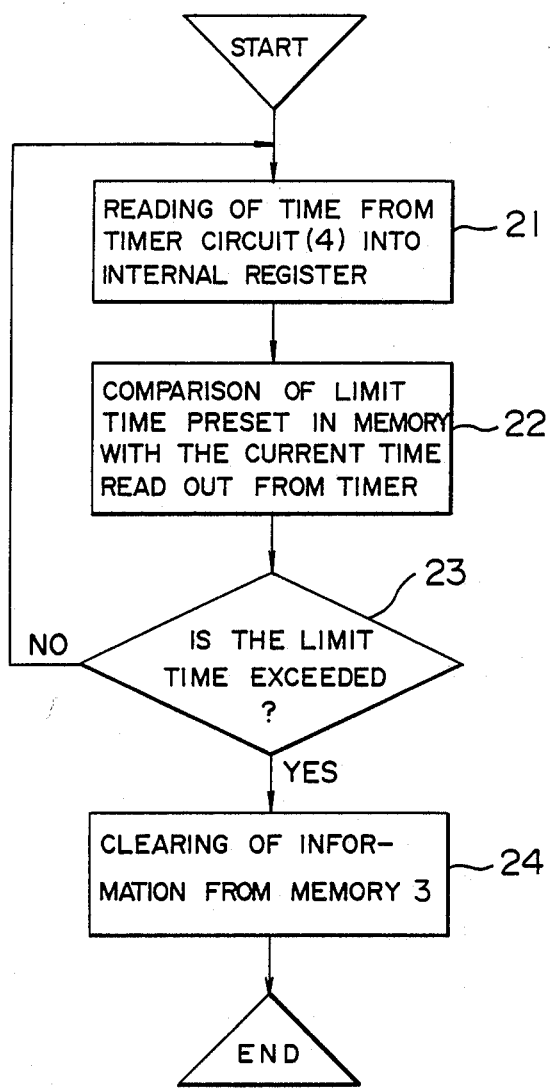
FIG. 2 is a view showing a flow chart for illustrating a flow of processing performed internally of the IC card shown in FIG. 1.

FIG. 2 shows in a flow chart a processing flow of the program stored in the memory 3 and read out to be executed by the processor 2. Parenthetically, FIG. 2 shows only a portion of the processing flow that is relevant to the present invention. In precedence to the execution of the processing illustrated in FIG. 2, requisite initial information is written in the memory 3 of the IC card from the external reader/writer device, being followed by resetting of the current time information stored in the register of the timer circuit 4 by the microprocessor 2 by way of the signal line 13. Thereafter, the clock mechanism incorporated in the timer circuit starts and continues the time-keeping operation with the instant time information placed in the associated register being progressively and incrementally updated. At a step 21, the processor 2 executes the instruction of reading the current time from the timer circuit 4 and storing it in the internal register of the processor. Subsequently, at a step 22, the processor 2 reads out a predetermined limit time previously stored in the memory to compare it with the current time placed in the internal register of the processor. At a decision step 23, it is checked whether the current time exceeds the limit time. If the answer of the decision step 23 is negative (NO), the step 21 is regained to read out again the current time from the timer circuit 4. When the instant time is found to exceed the limit time after lapse of a predetermined time, execution of the processor 2 proceeds to a step 24 where all the information placed externally is cleared or erased except for the program stored in the memory 3. In this manner, the IC card under consideration is imparted with a time, limiting function and the capability of erasing the secret information resident in the memory 3 after lapse of a preset time. Thereafter, the processor 2 sends back a reply indicating inhibition of any transaction in response to the command issued by the reader/writer.

In the IC card described above, it has been assumed that the limit time is held in the memory 3. It should however be understood that such arrangement may be equally adopted in which the limit time is held in the internal register of the processor 2 or alternatively in the timer circuit 4 itself. In the latter case, the comparison of the instant time with the limit time may be performed in the timer circuit 4, wherein when the current time exceeds the limit time, the timer circuit 4 issues an interrupt request to the processor 2. In response thereto, the microprocessor 2 clears the information to be protected from the memory 3.

Further, it should be added that since the IC card according to the embodiment of the invention described above incorporates the timer circuit 4 designed to perform constantly the time keeping operation and the power supply 5, it will be self-explanatory that the IC card can be utilized as a time-piece by additionally providing the IC card with a display mechanism for displaying the current time.

In the IC card according to the embodiment of the invention described above, there may arise such a situation where information might be lost due to the time-out even when the card is carried by the authorized owner because of the time limiting function characterizing the IC card. To deal with such a situation, there may be adopted two measures mentioned below.

First, when the user of the IC card is verified to be the authorized one, the information once erased is rewritten in the memory. In this case, since the IC card is in the state ready for allowing the initial information to be again written in, the current time stored in the register incorporated in the timer circuit 4 can be reset upon writing-in of the initial information.

Figure 3:
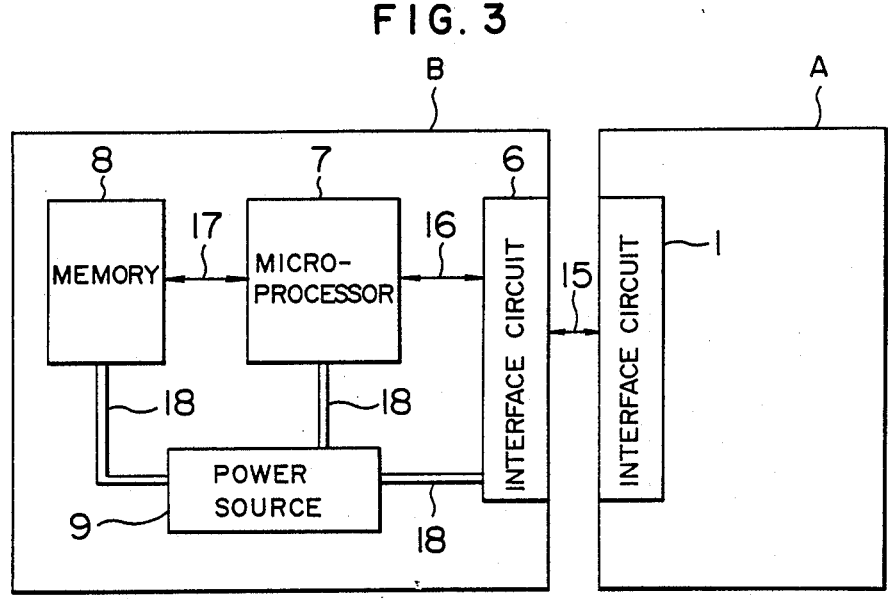
FIG. 3 is a block diagram showing an arrangement of a card holder according to another embodiment of the present invention.

As a second measure, it is conceived to stop the time limiting function from operating only when the IC card is normally used by the authorized possessor. To this end, a dedicated card holder such as the one shown in FIG. 3 may be used. In FIG. 3, a reference character A indicates the IC card shown in FIG. 1 which will be referred to as "IC card A" in association with the information recorded therein. In FIG. 3, a reference character B denotes a card holder for the IC card A which can issue a command for stopping the time limiting function of the IC card A, as described below.

Now, referring to FIG. 3 which shows in a block diagram a general arrangement of the card holder, a reference numeral 7 denotes a microprocessor or alternative control means responsible for the control of the card holder on the whole. A reference numeral 8 denotes a memory connected to the processor 7 by way of a signal line 17 for storing therein the program to be executed by the processor 7 together with information read out by the processor. There are two types of information to be read out. One information is a first PIN memorized by the possessor of the IC card and also stored in the memory 3. The other information is a second PIN which need not be known to the possessor of the IC card and which is transferred between the IC card A and the card holder B. The second PIN is the secret information inherent to the IC card A. A reference numeral 6 denotes an interface circuit which is connected to the possessor 7 by way of the signal line 16 on one hand and connected to the IC card A through the contact terminals and serves for conversion of the signal supplied from the IC card to a signal to be transferred to the processor 7. Finally, a numeral 9 denotes a power supply circuit connected to the interface circuit 6, the processor 7 and the memory 8 by way of a power line 18 for supplying electric power to these members.

FIG. 4 shows in a flow chart those portions of the program stored in the memories 8 and 3 and read out for execution by the processors 7 and 2, respectively, which are essentially relevant to the processing flow taking place in carrying out the present invention. In precedence to execution of the processing illustrated in FIG. 4, it is required that the first and second PINs inherent to the IC card A be written in the memory 3 as the initial information for the card A from an external reader/writer. Additionally, the same first and second PINs have to be written in the memory 8 of the card holder B. At the instant that the initial information is loaded in the IC card A, the processor 2 resets the current time kept in the timer circuit 4, being followed by the processing described hereinbefore in conjunction with FIG. 2.

When a possessor of the IC card desires to stop the time limiting function thereof, the IC card A is connected to the card holder B. In that case, the processing shown in FIG. 4 is carried out in the manner mentioned below so long as the current time remains within the limit time. In the first place, the processor 7 executes the instruction at a step 71 to issue to the IC card A a command requesting for the first PIN. When this command is fetched in the register incorporated in the processor 2 through the interface circuit 6, the signal line 15 and the interface circuit 1, the processor 2 decodes this command by executing a sequence of instructions (step 25). Next, the processor 2 reads out the first PIN from the memory 3 (step 26), being followed by a step 27 where the first PIN is sent to the card holder B. The processor 7 receives this first PIN (step 72). Subsequently, the processor 7 receives this first PIN (step 72). Subsequently, the processor 7 reads out the first PIN from the memory 8 (step 73) to check whether the received first PIN coincides with the one read out from the memory 1 (step 74). Unless coincidence is found, the processing comes to an end. Upon coincidence, the second PIN is read out from the memory 8 (step 75) to send the second PIN to the IC card A (step 76). The processor 2 receives this second PIN (step 28). Next, the processor 2 reads out the second PIN from the memory 3 (step 29) to check whether the received second PIN coincides with that read out from the memory 3 (step 30). Unless coincidence is resulted, the processing comes to an end. Otherwise, the processor 2 issues a reset signal to the timer circuit 4 (step 31) to complete the processing. Of course, instead of resetting the current time kept in the timer circuit 4, the limit time may be altered. In other words, either one of the limit time and the current time may be altered so that the time difference between them can be increased.

The processing at the step 71 to 74 and the steps 25 to 27 illustrated in FIG. 4 may be omitted. More specifically, the card holder B may read out the second PIN from the memory 8 to send it to the IC card A (steps 75 and 76). In response thereto, the IC card A reads out the second PIN from the memory 3 to compare it with the PIN received from the card holder B, wherein only upon coincidence resulting from the comparison, the reset signal is issued to the timer circuit 4 (steps 28 to 31). This processing is optimally suited for the system in which the first PIN is not adopted or the system in which the first PIN is employed but inhibited from being read out of the IC card A, although it can be applied to the other systems without involving problems. In order to prevent attempts for making access to the second PIN from being performed endlessly, such arrangement may be adopted in which the use of the IC card is inhibited when the number of times such attempt was made has attained a predetermined value.

It must be mentioned that the card holder B should be securely fixed to a place such as a waist belt to thereby reduce to minimum the possibility of both the IC card and the card holder being lost.

I claim:

1. An information carrying medium, comprising:
   storage means for pre-storing information to be protected;
   timer means for constantly keeping the time lapse after activation thereof in terms of the current time;
   control means for examining whether said current time reaches a limit time for erasing the information to be protected, when said current time reaches said limit time; and
   power supply means for supplying electric power to said storage means, said timer means and said control means.

2. An information carrying medium according to claim 1, wherein said control means is constituted by a microprocessor.

3. An information carrying medium according to claim 1, wherein said limit time is stored in said storage means.

4. An information carrying medium according to claim 1, wherein said limit time is stored in said control means.

5. An information carrying medium, comprising:
   storage means storing information to be protected;
   timer means for constantly keeping the time lapse after activation thereof in terms of current time;
   control means for controlling said storage means and said timer means; and
   power supply means for supplying electric power to said storage means, said timer means and said control means;
   wherein said control means checks whether said current time reaches a preset limit time, said information to be protected being erased when said current time reaches said preset limit time, and otherwise said control means comparing a personal identification number held internally with a personal identification number supplied externally to alter either one of said limit time or said current time so that difference therebetween is increased.

6. An information carrying medium according to claim 5, wherein said control means is constituted by a microprocessor.

7. An information carrying medium according to claim 5, wherein said limit time is stored in said storage means.

8. An information carrying medium according to claim 5, wherein said limit time is stored in said control means.

9. An information carrying medium according to claim 5, wherein said internal personal identification number is held in said storage means.

10. An information carrying medium according to claim 5, wherein said external personal identification number is sent from a card holder connected to said information carrying medium through contact connection, wherein said card holder includes storage means storing said external number, and control means for reading out said external number from said storage means and sending said external number to said information carrying medium.

* * * * *